No. 766,529. PATENTED AUG. 2, 1904.
W. RUNGE.
CLUTCH FOR LATHES OR OTHER PURPOSES.
APPLICATION FILED APR. 13, 1903.
NO MODEL.
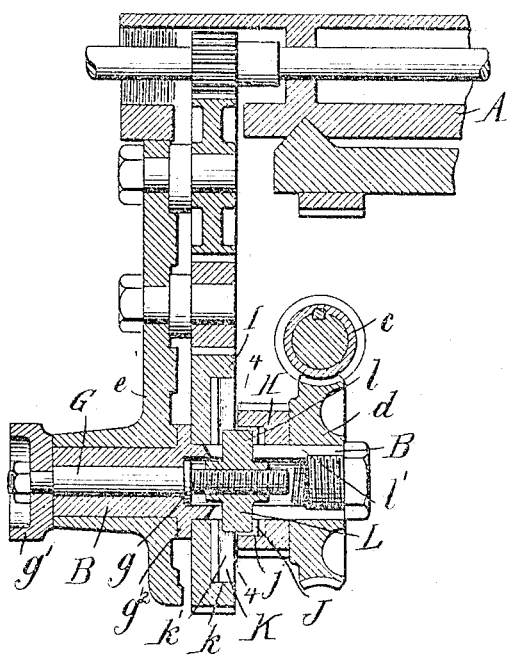
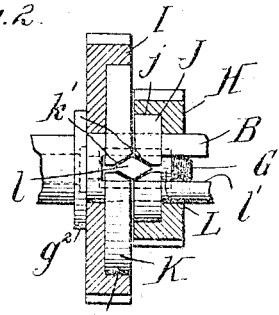
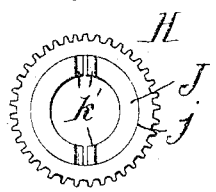
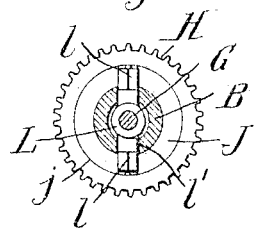
Witnesses:—
Inventor
Wm Runge
by Wilhelm & Bonner,
Attorneys.

No. 766,529. Patented August 2, 1904.

UNITED STATES PATENT OFFICE.

WILLIAM RUNGE, OF SENECA FALLS, NEW YORK, ASSIGNOR TO THE SENECA FALLS MANUFACTURING COMPANY, OF SENECA FALLS, NEW YORK.

CLUTCH FOR LATHES OR OTHER PURPOSES.

SPECIFICATION forming part of Letters Patent No. 766,529, dated August 2, 1904.

Application filed April 13, 1903. Serial No. 152,315. (No model.)

*To all whom it may concern:*

Be it known that I, WILLIAM RUNGE, a citizen of the United States, residing at Seneca Falls, in the county of Seneca and State of New York, have invented new and useful Improvements in Clutches for Lathes or other Purposes, of which the following is a specification.

This invention relates to improvements in clutches, and more particularly to clutches used in lathes for throwing into and out of action the longitudinal and cross feed gearing.

The object of the invention is to provide an efficient practical clutch of simple, strong, and inexpensive construction for coupling either of two wheels or analogous parts separately to a shaft and uncoupling both of the wheels or parts from the shaft.

In the accompanying drawings, Figure 1 is a vertical transverse section of a portion of a lathe bed and carriage provided with a clutch embodying the invention. Fig. 2 is a horizontal section through the gear-wheels, showing the clutch-shaft, clutch-rings, and ring-expanding block in plan. Fig. 3 is an elevation of one of the gear-wheels and its clutch-ring. Fig. 4 is a sectional elevation in line 4 4, Fig. 1.

Like letters of reference refer to like parts in the several figures.

A represents the apron of a lathe-carriage or other suitable support for the clutch device, and B a shaft, hereinafter called the "clutch-shaft," which is journaled in a bearing on the apron or support and is driven by suitable means—for instance, by a worm $c$, which is positively driven and meshes with and drives a worm-wheel $d$, secured to the clutch-shaft. As shown in the drawings, the clutch-shaft is hollow and is provided at its front end with a journal, which is seated and turns in a bearing $e$ on the apron.

G represents a spindle which passes loosely through and is adapted to rotate in an axial hole in the clutch-shaft. The spindle is provided with a collar or shoulder $g$, which engages an internal shoulder on the hollow shaft and has secured to its outer end in any suitable manner a hand-wheel or milled nut $g'$ for turning the spindle. The clutch-shaft is retained in its bearing by the hand-wheel or milled head, which bears against the outer end of the bearing, and a collar or shoulder $g^2$ on the shaft, which engages the inner end of the bearing.

H and I represent gear-wheels, which are preferably journaled to rotate on the clutch-shaft between the worm-wheel and the shoulder $g^2$ of the shaft. The gear-wheel H is operatively connected, for example, with a suitable train of gearing by which the lathe-carriage is moved longitudinally when the gear-wheel is coupled to and driven by the clutch-shaft, and the other wheel, I, on the clutch-shaft is operatively connected, for example, with a suitable train of gearing by which the cross-slide is moved when the said gear-wheel I is coupled to and driven by the clutch-shaft.

H and I may represent loose wheels or analogous parts to be coupled to a shaft for other purposes.

The clutch device for coupling either of the gear-wheels H I to the clutch-shaft is preferably constructed as follows: The gear-wheels H and I are provided in their adjacent or contiguous sides with circular cavities $j$ and $k$, respectively, and in these cavities are respectively located friction clutch-rings J and K. The clutch-rings are preferably alike, and each consists of two semicircular sections or halves the meeting ends of which are provided with beveled or inclined faces $k'$.

L represents a movable block or device for expanding the clutch-rings. The block is provided with a screw-threaded hole in which engages the threaded inner end of the spindle G. The ring-expanding block is provided with opposite arms $l$, which project outwardly through longitudinal slots $l'$ in the hollow clutch-shaft, and the outer end of each arm is of double-wedge or substantially diamond shape. These double-wedge-shaped ends of the arms are located in the space formed between the inclined faces of the split clutch-rings carried by the two gear-wheels H and I.

When the spindle G is turned in one direction, the ring-expanding block, which is held from rotation relative to the clutch-shaft by the engagement of its arms in the slots of the shaft, is moved rearwardly or toward the gear-wheel H and the wedges on its arms engage the inclined faces on the ends of the sections of the clutch-ring J for said gear-wheel and spread or expand the sections of the clutch-ring so that their circular faces frictionally engage the opposing circular face of the cavity in the gear-wheel in which said clutch-ring is located and cause the gear-wheel to rotate with the clutch-shaft. When the spindle G is turned in the opposite direction, the ring-expanding block is moved forwardly or toward the gear-wheel I, and the wedges at the outer ends of its arms similarly spread or expand the sections of the clutch-ring located in the cavity in said gear-wheel I and couple this gear-wheel to the clutch-shaft. When either of the gear-wheels is coupled to the clutch-shaft, the other gear-wheel is loose thereon, and when the ring-expanding block is moved to an intermediate position both of the gear-wheels are loose on the clutch-shaft.

The clutch device is not restricted to application to the feed-gearing for lathes hereinbefore described, but is applicable to other uses where it is desired to connect either of two wheels to a shaft.

I claim as my invention—

1. The combination of a hollow slotted shaft, wheels mounted to turn about the axis of said shaft, an expansible clutch-ring for each of said wheels, a ring-expanding block arranged to move longitudinally in said shaft and provided with a fixed part projecting out through the slot in said shaft between the adjacent faces of said clutch-rings for expanding the latter, and a rotatable screw-stem in said shaft for moving said expanding-block into and out of engagement with said clutch-rings to expand the latter, substantially as set forth.

2. The combination of a hollow slotted shaft, wheels loosely mounted to turn about said shaft, expansible clutch-rings arranged side by side in cavities in the adjacent sides of said wheels, a ring-expanding block arranged to move longitudinally in said shaft and provided with an arm projecting radially through the slot in said shaft between the adjacent faces of said clutch-rings, and a rotatable screw-stem in said shaft for moving said expanding-block into and out of engagement with said clutch-rings, substantially as set forth.

3. The combination of a hollow shaft, wheels loosely mounted side by side on said shaft and provided in their adjacent faces with cavities, expansible clutch-rings arranged side by side in said cavities, a ring-expanding block mounted to turn with and move longitudinally of said shaft and having a wedge portion located between the clutch-rings, and a rotatable screw-stem located in said hollow shaft for moving said expanding-block longitudinally of the shaft to carry said wedge into and out of engagement with clutch-rings, substantially as set forth.

4. The combination of a hollow shaft provided with longitudinal slots, loose gear-wheels mounted concentric with said shaft, a clutch-ring arranged between each of said gear-wheels and said shaft, a block movable longitudinally in said shaft and provided with arms extending through said slots and having inclined faces adapted to engage said clutch-rings to cause the latter to frictionally engage said gear-wheels, and a spindle in said hollow shaft and provided with a screw-thread engaging said block to move the latter longitudinally of said shaft, substantially as set forth.

5. The combination of a hollow shaft provided with longitudinal slots, gear-wheels loosely mounted on said hollow shaft and having cavities in their contiguous sides, expansible clutch-rings located in said cavities, and having inclined faces a ring-expanding block movable longitudinally in said hollow shaft and provided with arms extending through said slots between said clutch-rings, said arms having inclined faces adapted to engage the inclined faces on said clutch-rings to expand the latter, and a spindle in said hollow shaft and provided with a screw-thread working in a threaded hole in said ring-expanding block to move the latter longitudinally, substantially as set forth.

Witness my hand this 7th day of April, 1903.

WILLIAM RUNGE.

Witnesses:
CHARLES F. HAMMOND,
ADELBERT S. DAVIS.